Aug. 14, 1945.　　　H. W. MACKEY　　　2,382,324
GRAINING MACHINE
Filed Jan. 19, 1942　　　4 Sheets-Sheet 1

INVENTOR.
HENRY W. MACKEY
BY Whittemore Hulbert & Belknap
ATTORNEYS

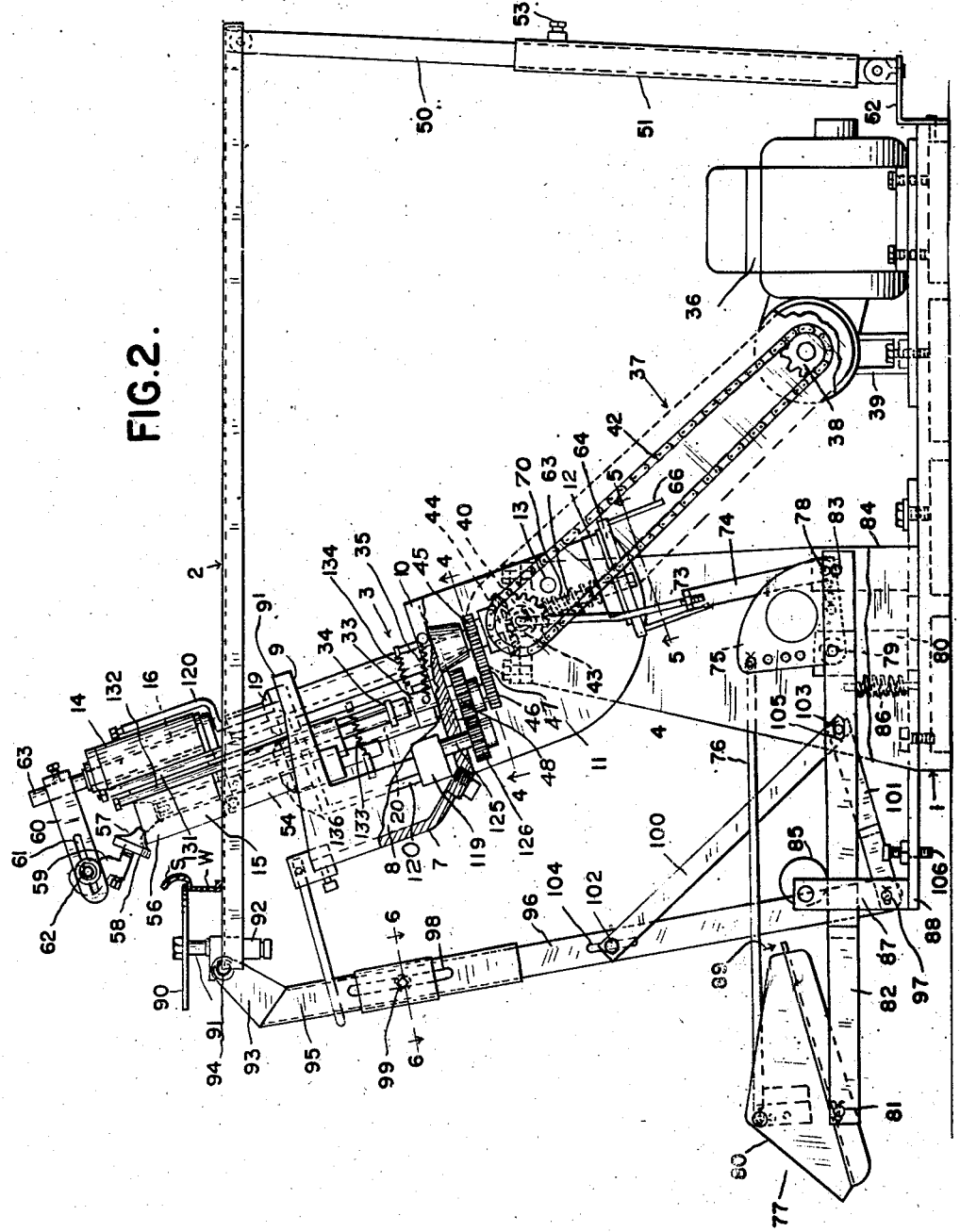

Aug. 14, 1945.  H. W. MACKEY  2,382,324
GRAINING MACHINE
Filed Jan. 19, 1942  4 Sheets-Sheet 3

INVENTOR.
HENRY W. MACKEY
BY Whittemore Hulbert & Belknap
ATTORNEYS

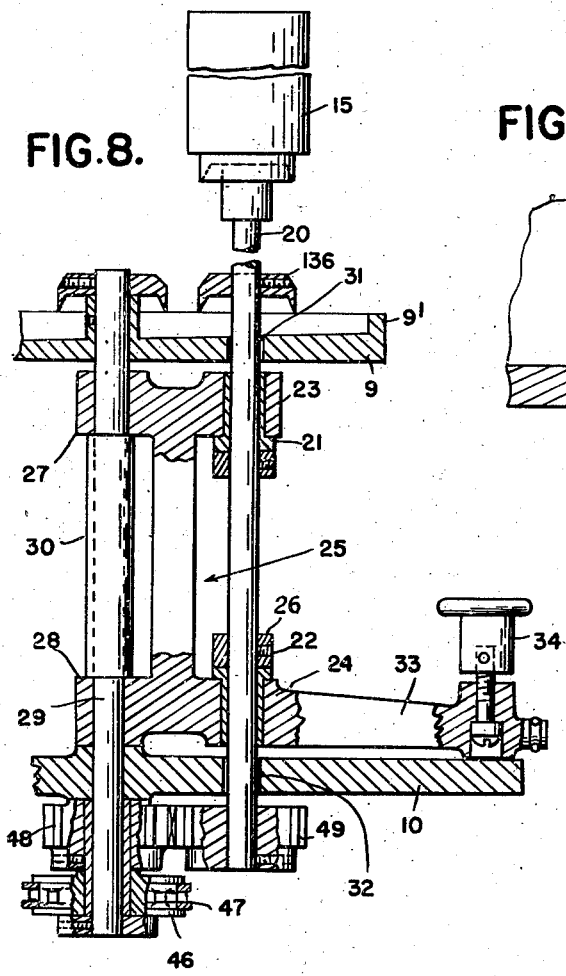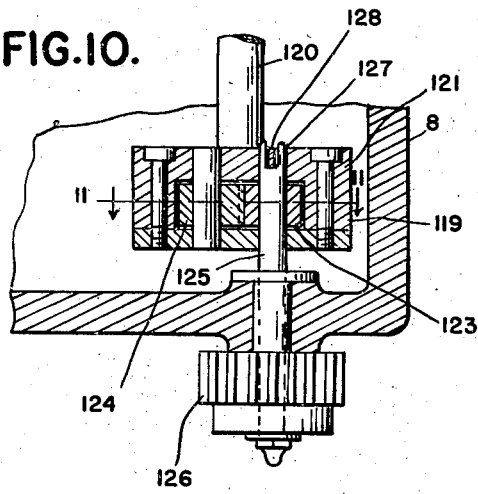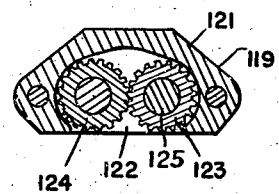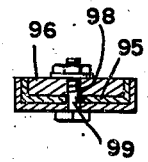

Patented Aug. 14, 1945

2,382,324

UNITED STATES PATENT OFFICE 2,382,324

GRAINING MACHINE

Henry W. Mackey, Detroit, Mich., assignor to Motor Products Corporation, Detroit, Mich., a corporation of New York Application January 19, 1942, Serial No. 427,365

3 Claims. (Cl. 101—366)

The invention relates to graining machines and refers more particularly to machines for graining or printing on hollow work such as garnish molding for use on automobile windows.

The invention has for some of its objects to provide an improved graining machine so constructed that gravity has no effect upon the work tending to move the work away from the impression roll; to provide the graining machine with a support for the impression roll which is angularly movable to accommodate work having different transverse contours; and to provide the graining machine so constructed that the table for supporting the work is adjustably mounted to extend horizontally.

The invention has for other objects to provide the graining machine with an improved device engageable with the impression roll to change its contour to approximately conform to the work; with an improved device for moving the work against the impression roll; and with mechanism for actuating the devices, including a manually operable member adapted to swing about its pivotal axis to actuate one device and to move bodily to actuate the other device.

The invention has for a further object to provide the graining machine with an ink or printing fluid pump and a driving means therefor constructed to enable the pump to be readily inserted into and removed from the ink or printing fluid reservoir and detachably connected to the driving means when in place.

With these as well as other objects in view, the invention resides in the novel features of construction and combinations and arrangements of parts as more fully hereinafter set forth.

In the drawings:

Figure 2 is a side elevation partly broken away thereof;

Figure 1:
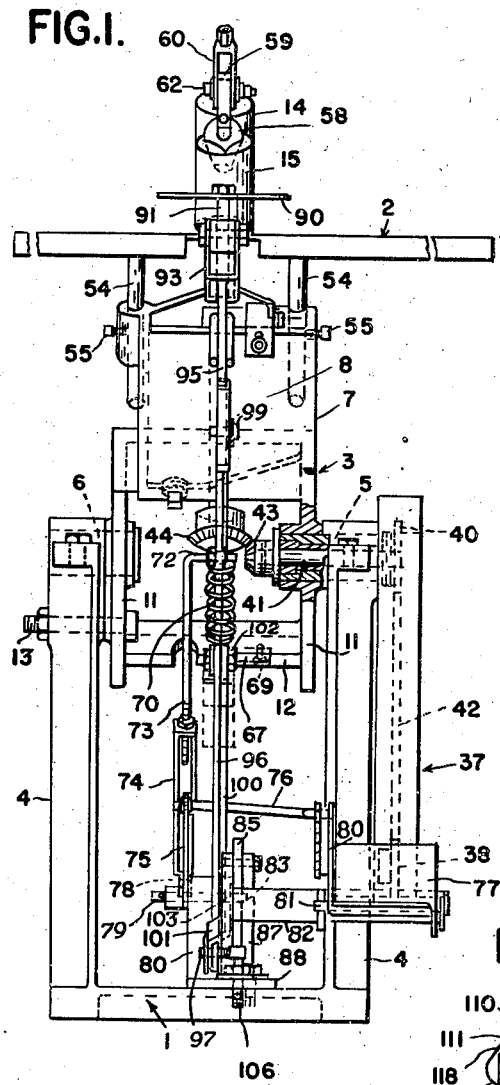
Figure 1 is a front elevation, partly broken away, of a graining machine embodying the invention.
Figure 7:
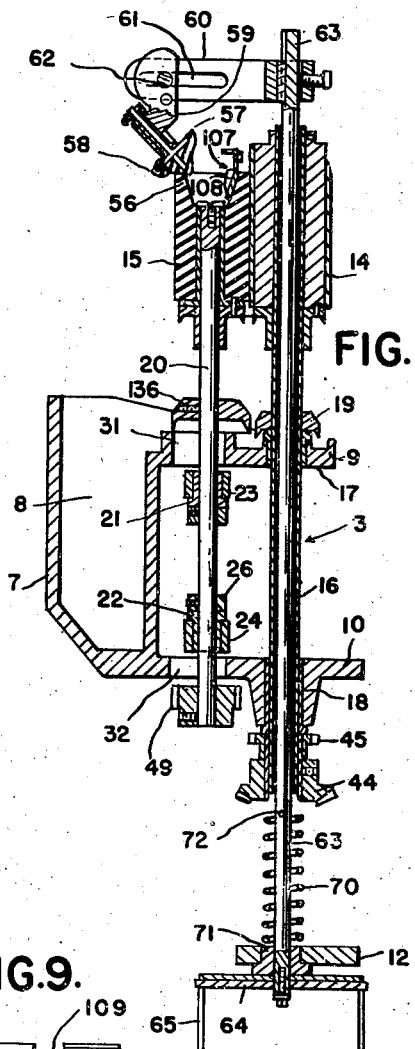
Figure 9:
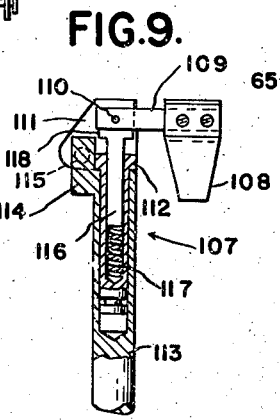
Figure 3:
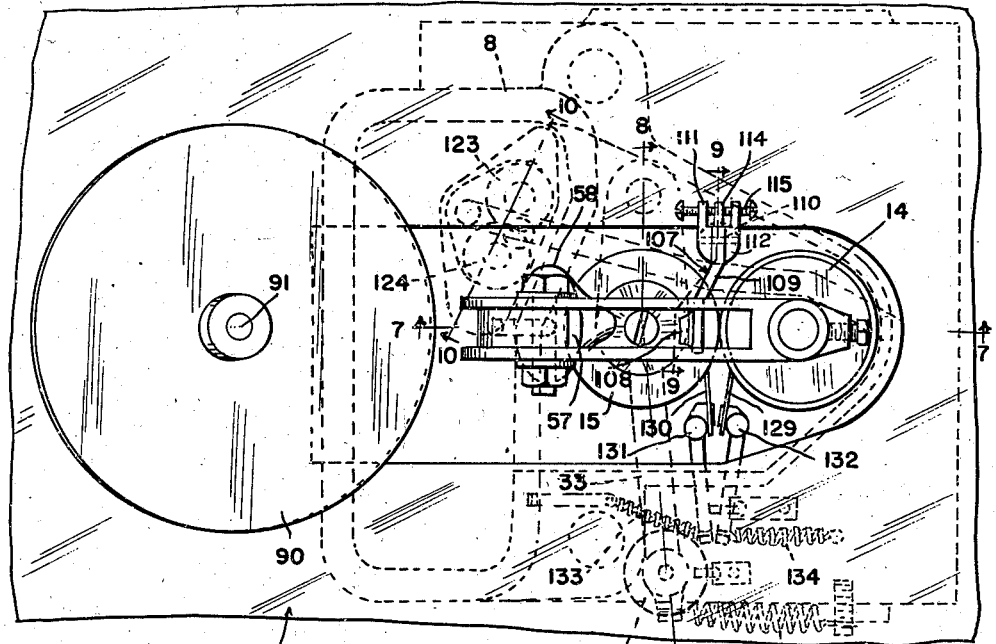
Figure 3 is a top plan view of a portion thereof.
Figures 4, 5:
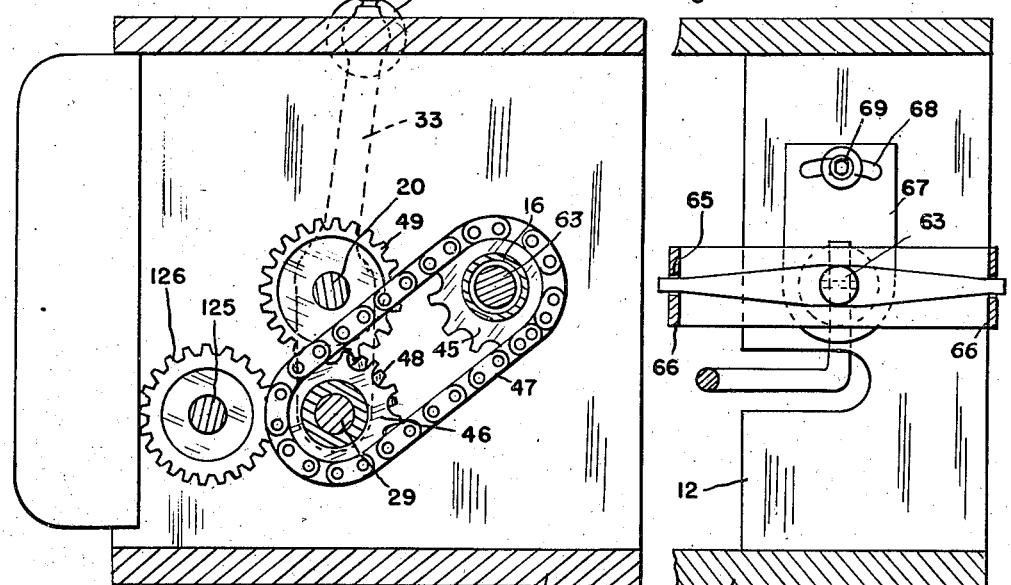

Figures 4, 5 and 6 are cross sections on the lines 4—4, 5—5 and 6—6, respectively, of Figure 2;

Figures 7, 8, 9 and 10 are cross sections on the lines 7—7, 8—8, 9—9 and 10—10, respectively, of Figure 3;

Figure 11 is a cross section on the line 11—11 of Figure 10.

As illustrated in the present instance, the work grained or printed on by the graining machine is an automobile window garnish molding W.

The machine in general comprises the base 1, the table 2 above the base for supporting the garnish molding W and the graining unit 3 mounted on the base and extending upwardly through an elongated opening in the table and adapted to grain or print on the transversely curved or rounded surface S of the garnish molding.

The base 1 has the laterally spaced uprights 4 carrying at their upper ends the transverse horizontally extending axially aligned gudgeons 5 and 6 on which is journaled the support 7 of the graining unit 3. The support is preferably made in one piece and has in its upper portion and toward the front of the machine the reservoir 8 for the ink or printing fluid, in its upper portion and extending transversely of and rearwardly from the upper and lower ends of the reservoir the upper and lower walls 9 and 10, respectively, and in its lower portion the laterally spaced side walls 11 and the transverse wall 12 extending between the side walls at their lower ends. The side walls 11 are journaled on the gudgeons 5 and 6 so that the support is adapted to swing through a vertical path. The support is adapted to be secured in various positions of rotative adjustment by suitable means such as the bolt 13 which extends through a hole in an upright 4 and an arcuate hole in a side wall 11, the arcuate hole being concentric with the gudgeons.

The support 7 carries the pattern roll 14 and the transfer or impression roll 15, both of which form part of the graining unit and are located above the support and also extend above the table 2. The pattern roll 14 encircles and is fixedly secured to the upper end portion of the hollow shaft 16 which extends through the upper and lower walls 9 and 10 of the support and is journaled in suitable bearings 17 and 18, respectively, in the upper and lower walls. The shaft is supported by means of the collar 19 fixedly secured thereto and resting upon the upper bearing 17. The transfer roll 15 encircles and is fixedly secured to the upper end portion of the shaft 20 which extends through the upper and lower walls 9 and 10, respectively, and is journaled in the upper and lower bearings 21 and 22 carried by the upper and lower lateral extensions 23 and 24, respectively, of the swivel head 25. The shaft 20 is supported by the collar 26 fixedly secured to the shaft and engaging the lower bearing 22. The swivel head is located between the upper and lower walls 9 and 10, respectively, of the support and also has another set of upper and lower extensions 27 and 28 which are journaled on the pin 29 preferably non-rotatably secured in the upper and lower walls 9 and 10 in a zone offset to one side of the support beyond the shaft 20. The pin extends parallel to the shaft. The swivel head is carried by the support through the lower extension 28 resting on the lower wall 10 and also through the upper extension 27 resting on the spacer sleeve 30 between the upper and lower extensions 27 and 28. The openings 31 and 32 in the upper and lower walls 9 and 10, respectively, provide clearance for the shaft 20 to swing the swivel head about the pin 29. The swivel head is also formed with the arm 33 in continuation of the lower extension 24 and having secured to its free end the handle 34 through which the swivel head can be swung to move the transfer roll 15 out of contact with the pattern roll 14. It will be noted that the handle 34 is at the side of the machine opposite the pin 29 on which the swivel head is journaled. 35 is a coil spring connected to the arm and the lower wall 10 of the support to resiliently hold the transfer roll in contact with the pattern roll.

For the purpose of driving the pattern and transfer rolls, there is the prime mover 36 in the nature of an electric motor mounted on the base 1 toward the rear of the machine. The electric motor through suitable gearing drives the driving mechanism 37 comprising the sprocket 38 carried by the upright 39 on the base, the sprocket 40 fixed upon the shaft 41 journaled in the gudgeon 5, and the sprocket chain 42 running over the sprockets 38 and 40. The driving mechanism also comprises the bevel gear 43 fixed upon the inner end of the shaft 41 between the side walls 11 of the support 7. The driving mechanism upon the support 7 comprises the bevel gear 44 fixed upon the lower end of the shaft 16 and meshing with the bevel gear 43, whereby the pattern roll 14 is driven. The transfer roll 15 is driven through the sprocket 45 above and preferably integral with the bevel gear 44, the idler sprocket wheel 46 journaled on the pin 29, the sprocket chain 47 extending over the sprockets 45 and 46, the gear 48 above and driven by the sprocket 46, and the gear 49 fixed upon the lower end of the shaft 20. It will be noted that the gears, sprockets and sprocket chain of the driving mechanism on the support are all located below the lower wall 10 of the support. Also, that the gear fixed upon the shaft carrying the transfer roll meshes with a gear coaxial with the pivot of the swivel head carrying the transfer roll so that the two last mentioned gears will remain constantly in mesh regardless of the position of the transfer roll with respect to the pattern roll.

The table 2 is adjustably supported on the base 1 and the support 7 so that it may be maintained in horizontal position and also adjusted to the proper height so that it will support the garnish molding W horizontally and at the desired height to properly engage the transfer roll. As shown, the table is supported at its rear end on the rods 50 and 51 telescopically engaging each other. The rods 50 are pivotally connected at their upper ends to the table and the rods 51 are pivotally connected at their lower ends to the bracket 52 forming part of the base 1. The rods 50 and 51 are held in their relative positions of adjustment by suitable means such as the set screw 53. The table is also pivotally connected to the upper ends of the pair of rods 54 which slidably engage opposite sides of the upper portion of the support 7 and are adapted to be secured thereto by suitable means such as the set screws 55. The construction is such that the graining unit may be set to any desired angle for the transfer roll to properly engage the surface S of the garnish molding W, after which the table 2 may be adjusted to extend horizontally and at the proper height to secure the desired contact relation between the surface S and the transfer roll 15. By reason of this arrangement, the garnish molding will be properly grained and gravity will have no effect in tending to move the garnish molding away from the transfer roll.

For the purpose of making the transfer roll 15 to approximately conform to the transverse contour of the surface S, the transfer roll has a free upper end portion 56 extending above the upper end of its shaft 20 and its free upper end portion is adapted to be distorted in the zone adjacent the surface S by the device 57. This device comprises the roller 58 journaled in the bracket 59 secured to the arm 60. As shown, the arm is provided with the longitudinally extending slot 61 through which extends the bolt 62 used in clamping the bracket to the arm. The construction is such that the bracket may be adjusted longitudinally of and also angularly relative to the arm. The arm is fixedly secured to the upper end of the rod 63 which extends downwardly through the hollow shaft 16 and the transverse wall 12 of the support 7. The rod 63 has fixedly secured to its lower end the plate 64, opposite ends of which at a distance remote from the rod slidably engage the longitudinally extending slots 65 in the arms 66 of a yoke, the top of which has an arm 67 adjustably secured to the transverse wall 12. As shown, the arm 67 is provided with an arcuate slot 68 concentric with the shaft 63 for receiving the clamping bolt 69 which is threaded into the transverse wall. With this construction the rod 63 is positively held from rotation by the ends of the plate 64 engaging and being guided by the arms 66 at a distance remote from the rod, thereby affording considerable leverage. As a result, the roll 58 will be effectively held to engage the free end portion 56 of the transfer roll 15 directly opposite the surface S of the garnish molding W.

The distorting device 57 is normally held in its upper or inoperative position by means of the coil spring 70 encircling the rod 63 and having its lower end abutting the guide bushing 71 in the transverse wall 12. The upper end of the coil spring abuts the terminal portion 72 of the link 73, the terminal portion extending transversely through the rod 63. The link 73 is moved downwardly to move the distorting device 57 downwardly to operative position by mechanism comprising the yoke 74, the rockable or bell crank-like member 75, the rod 76 and the foot pedal 77. The yoke 74 is adjustably connected at its upper end to the lower end of the link 73 and is pivotally connected at 78 to one arm of the rockable or bell crank-like member 75. This member is pivotally mounted at 79 upon the upright 80 on the base 1 and its other arm is pivotally connected to the rear end of the rod 76 which has its front end pivotally connected to the side plate 80 of the foot pedal. The foot pedal is pivotally mounted at 81 upon the front end of the bar 82. The rear end of the bar 82 is pivotally connected at 83 to the upright 84 upon the base 1. To hold the bar 82 in its uppermost position, as determined by the cam 85, there is the coil spring 86 between the bar and the base. The cam, as shown, is secured to the upper end of the upright 87 upon the front end of the plate 88 forming part of the base.

With the construction as thus far described, it will be seen that upon swinging the foot pedal 77 about its pivot 81 in the direction of the arrow 89 in Figure 2, the rod 76 will be moved rearwardly to rock the rockable member 75 in a clockwise direction about its pivot, which in turn moves the yoke 74 downwardly to pull the link 73 downwardly. This link in turn pulls the rod 63 downwardly against the force exerted by the coil spring 70 and the rod 63 through the arm 60 and the bracket 59 moves the roll 58 into distorting relation with the free upper end portion of the transfer roll.

To move the garnish molding W into contact with the transfer roll 15, there is the pressure roll 90 engageable with the garnish molding and fixed upon the vertical shaft 91 which is journaled in the bracket 92. The bracket is movable in an elongated opening in the table 2 and is angularly adjustably secured to the horn 93 by suitable means, such as the bolt 94. The horn 93 is fixed upon the upper end of the bar 95 which is preferably of channel section and is telescopically engaged by the upper end of the bar 96 having its lower end pivotally connected at 97 to the upright 87. The upper end portion of the bar 96 is provided with the longitudinally extending slot 98 for receiving the bolt 99 for clamping the two bars together. With this construction, the axis of the pressure roll may be angularly adjusted and also the height of the pressure roll may be adjusted to secure proper contact of the pressure roll with the garnish molding.

The support for the pressure roll is adapted to be swung about the pivot 97 to force the garnish molding into contact with the transfer roll by means of the link 100, the rod 101, the bar 82 and the foot pedal 77. The upper end of the link 100 is pivotally connected by the bolt 102 to the bar 96 and the lower end of the link 100 is pivotally connected by the pin 103 to the rear end of the rod 101. This latter rod is pivotally connected to the upright 87 by the pivot 97. The bolt 102 extends through the longitudinally extending slot 104 in the bar 96 to provide for adjustment of the pivot relative to the bar. The pin 103 extends through the longitudinally extending hole 105 in the bar 82 so that the bar 82 upon being swung downwardly by its pivot 83 compels the pin 103 to move downwardly. During this time, the pin is moved rearwardly along the bar 82 by the rod 101 with the result that the pin pulls the lower end of the link 100 rearwardly so that the bolt 102 swings the bar 96 and its associated parts rearwardly to move the garnish molding through the pressure roll 90 into contact with the transfer roll 15. The bar 82 is swung downwardly against the resistance offered by the coil spring 86 by bodily downward movement of the foot pedal 77 and the downward movement is limited by the set screw 106 adjustably threadedly engaging the plate 88 of the base.

With the construction as above described, it will be seen that upon bodily downward movement of the foot pedal the garnish molding is moved into contact with the transfer roll. It will also be seen that by swinging movement of the foot pedal about its pivot the free upper end portion of the transfer roll will be distorted by the distorting device being moved downwardly. In operation, the garnish molding is preferably fed into contact with the transfer roll before the free upper end portion of the transfer roll is distorted.

For the purpose of holding the free upper end portion of the transfer roll opposite the pattern roll in contact with the latter, I have provided the guiding device 107 engageable with the interior of the free upper end portion 56. This guiding device comprises the guide member 108 preferably formed of sheet metal and having an arcuate surface engageable with the interior of the free upper end portion and the bar 109, to the free end of which the guide member 108 is fixedly secured. This bar extends between and is pivotally connected by the pin 110 to the furcations 111 upon the rod 112 which extends downwardly into the supporting rod 113 fixed upon the upper wall 9 of the support 7. The furcations 111 extend at opposite sides of the lug 114 upon the rod 113 and set screws 115 threadedly engaging the furcations 111 and abutting the lug 114 are adjustable to angularly position the rod 112 and the guide member carried thereby relative to the rod 113 to assure proper positioning of the guide member relative to the transfer roll. 116 is a plunger slidable within the rod 112 and resiliently urged upwardly by the coil spring 117 below the lower end of the plunger and located within a bore in the rod 112. The plunger has at its upper end the head 118 which is engageable with either the lower side of the bar 109 when the device is in operative position or the end of the bar 109 when the device is in inoperative position, at which latter time the bar 109 extends upwardly above the rods 112 and 113 and the guide member 108 is removed from the transfer roll.

119 is a pump within the ink or printing fluid reservoir 8 for supplying ink or printing fluid to the pattern roll 14 through the pipe 120. The pump comprises the casing 121 having the inlet opening 122 at one side and the meshing gears 123 and 124 within the casing adapted to draw the ink or printing fluid through the inlet opening and to discharge same through the outlet opening in the top of the casing and communicating with the pipe 120. The pump is adapted to be driven by the drive shaft 125 which extends through and is journaled in the portion of the lower wall 10 of the support 7 forming the bottom of the reservoir 8. The shaft has fixed to its lower end the gear 126 which meshes with the gear 48. The upper end portion of the shaft 125 is adapted to extend through the lower wall of the casing 121 and also the gear 123 when the pump is inserted into the ink or printing fluid reservoir. The upper end of the shaft is formed with the diametrical slot 127 for detachably receiving the key 128 which extends diametrically through the upper end portion of the gear 123 when the pump is inserted. With this construction, it will be seen that the pump may be readily inserted into or removed from the reservoir and its gears may be readily connected to or disconnected from the drive shaft. As a result, removal of the pump is facilitated to enable cleaning same or to enable replacement. The pump is suitably supported upon the bottom wall of the reservoir as by resting upon the packing for sealing the joint between the bottom wall of the reservoir and the pump shaft.

Surplus ink or printing fluid is removed from the pattern and transfer rolls by means of doctor blades 129 and 130, respectively, these blades being mounted on the rods 131 and 132, respectively, which extend through the upper wall 9 and into the lower wall 10 of the support 7 and are supported by the latter wall. The coil springs 133 and 134 resiliently hold the wiper blades in place.

The surplus ink drops from the wiper blades 129 and 130 onto the upper wall 9 of the support 7 which is formed with the upstanding flange or bead 9' to guide the ink or printing fluid to the reservoir 8. The collar 19 on the shaft 16 and also the collar 136 fixedly secured to the shaft 20 form deflectors for preventing the ink or printing fluid from passing downwardly along the shafts.

What I claim as my invention is:

1. A graining machine comprising a pattern roll, a transfer roll, a support, shafts carrying said rolls, one of said shafts being rotatably mounted on said support, a swivel head carrying the other of said shafts, a pin on said support on which said swivel head is journaled and means for driving said rolls comprising a gear on said shaft rotatably mounted on said support, a sprocket on said last mentioned shaft, an idler sprocket journaled on said pin and driven by said first mentioned sprocket, a second gear on said shaft carried by said swivel head, and a third gear meshing with said second gear and driven by said second mentioned sprocket.

2. Inking mechanism for a graining machine comprising an ink reservoir, a drive shaft extending upwardly through a bottom wall of said ink reservoir into the latter, and an ink pump within said ink reservoir for pumping ink, said pump being insertable downwardly into said ink reservoir and having a rotatable member detachably connected within said ink reservoir to said drive shaft.

3. Inking mechanism for a graining machine comprising a support for rolls of the graining machine having an ink reservoir and carrying driving mechanism for the rolls, a drive shaft connected to the driving mechanism and extending within the ink reservoir through the bottom wall thereof, and an ink pump within said ink reservoir for pumping ink, said pump being insertable into and removable from said ink reservoir through an opening in the upper end thereof and having a rotatable member detachably connected to said drive shaft within said ink resevoir.

HENRY W. MACKEY.